May 1, 1956 — I. KALIKOW — 2,744,205
DYNAMOELECTRIC MACHINE CURRENT COLLECTOR SHIELDING BRUSHHOLDER
Filed Aug. 2, 1951 — 3 Sheets-Sheet 1
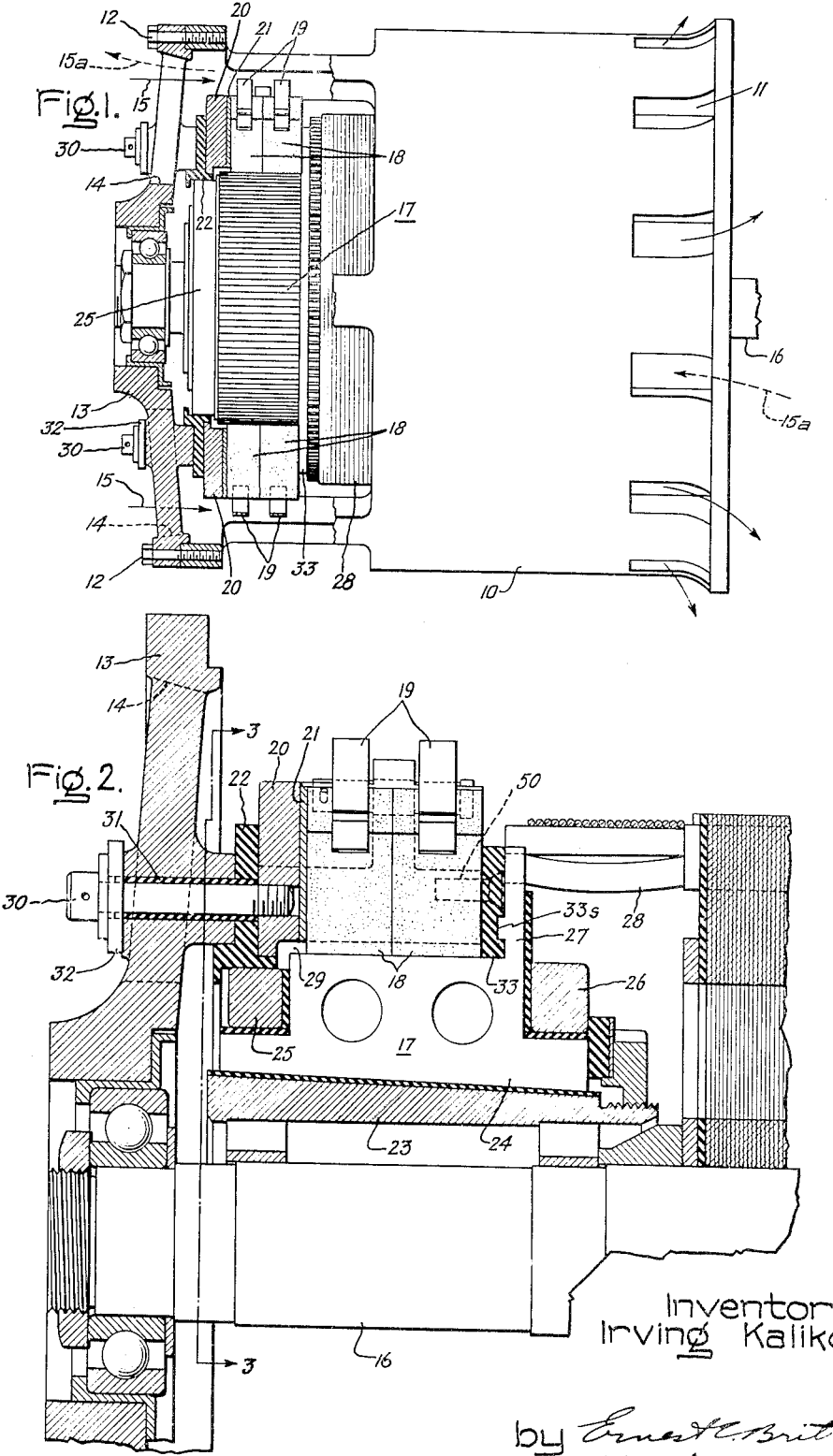
Inventor:
Irving Kalikow,
by Ernest H. Britton
His Attorney.

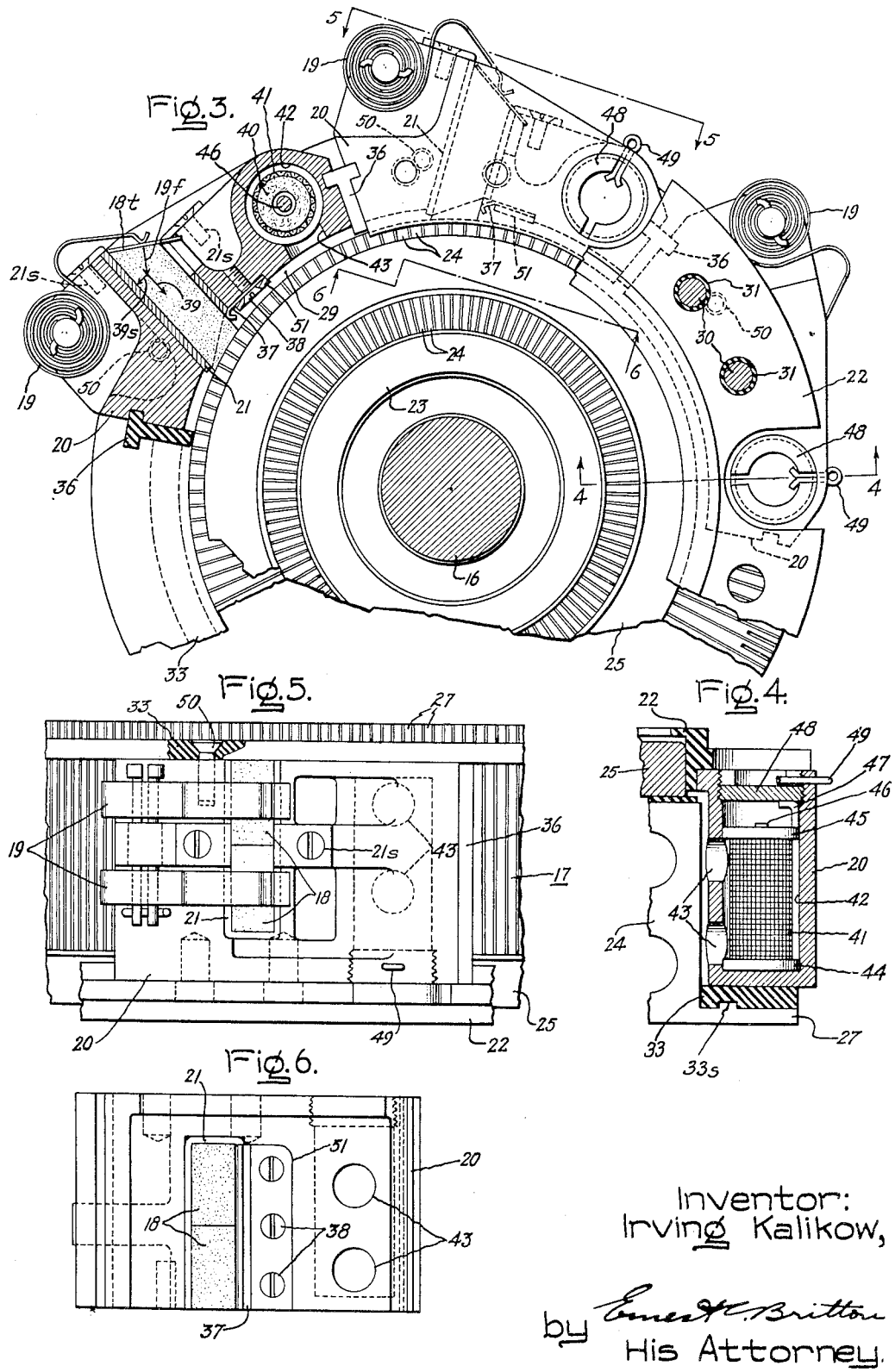

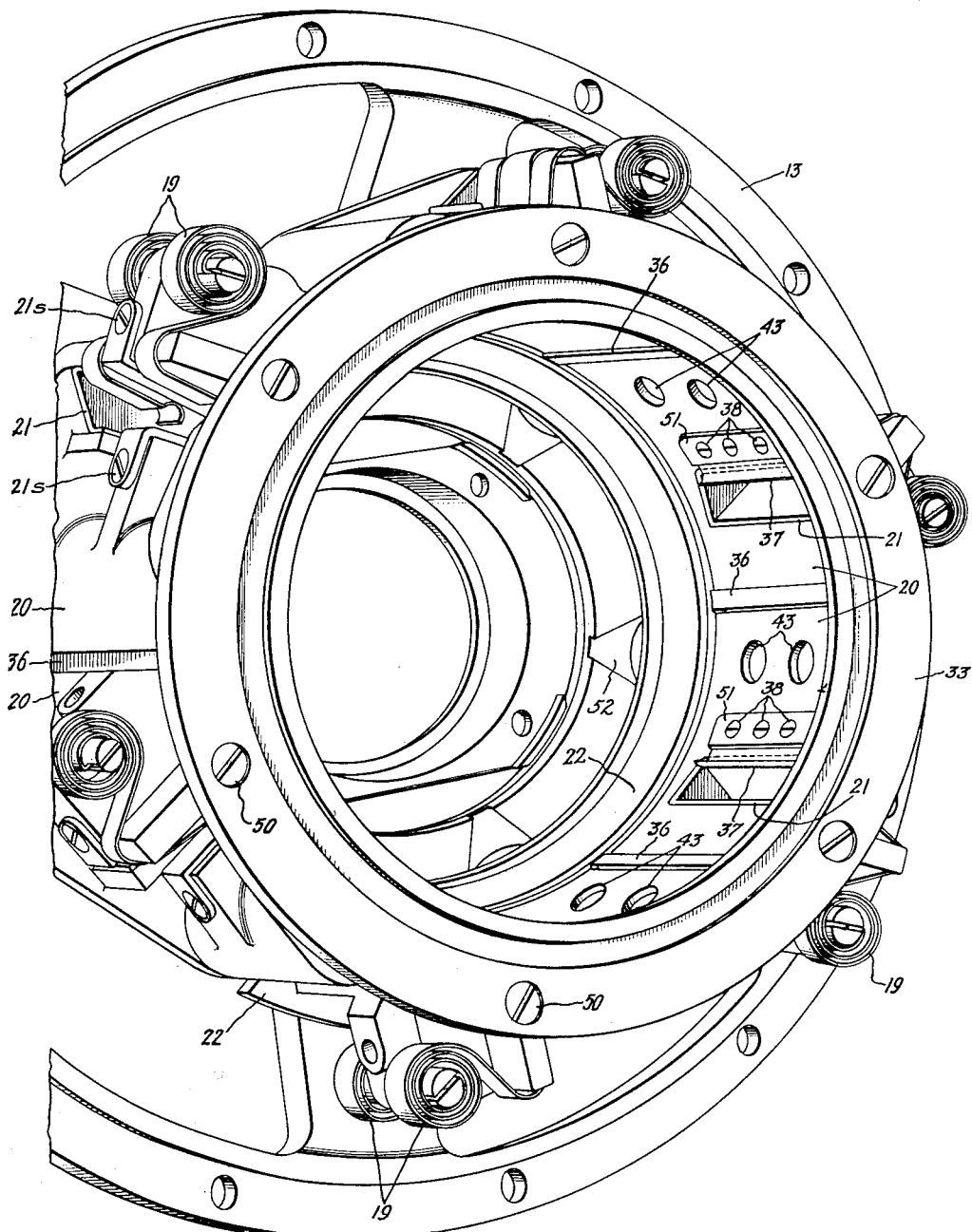

United States Patent Office 2,744,205
Patented May 1, 1956

2,744,205

DYNAMOELECTRIC MACHINE CURRENT COLLECTOR SHIELDING BRUSHHOLDER

Irving Kalikow, Swampscott, Mass., assignor to General Electric Company, a corporation of New York Application August 2, 1951, Serial No. 239,877

10 Claims. (Cl. 310—228)

My invention relates to dynamoelectric machines and more particularly to a collector shielding brushholder of a type useful for providing vapor lubrication of collector and brushes for overcoming contact difficulties as in commutating type dynamoelectric machines for high flying aircraft.

It is well known that at high altitudes, ordinary, or even specially treated, carbon commutating brushes required for electrical equipment tend to rapidly dust away unless suitably protected from the rarefied and dry atmosphere. Such protection is rendered difficult because of the large blasts of cooling air required to cool the associated electrical equipment, such as the commutator and brushes themselves. The idea of using a shielded collector with mating brush and collector surfaces thereby isolated from the cooling air blast, and with the shielding enclosure continually, during operation, supplied with a brush-life enhancing vapor, has been disclosed and claimed in copending application Serial No. 213,385, now Patent No. 2,703,372 filed March 1, 1951 by Robert H. Savage and assigned to the assignee of the present invention. In said application, Savage has disclosed for use within the collector shielding enclosure, a heat responsive vapor generator for providing the necessary vapor. It has been found, however, that in an arrangement such as that proposed by Savage, the vapor generator is often so surrounded by insulation that it cannot perform its proper function of exuding vapor at a rate responsive to requirements, while at the same time remaining free of all mechanical holding or vibration stresses.

It is an object of the present invention to provide simple means for overcoming the above-mentioned difficulties.

A further object of the present invention is to provide for a dynamoelectric machine a current collector shielding brushholder construction having formed integrally therein an intimately associated vapor generator chamber, so that all parts of the shielding brushholder, as well as the brushes and any vapor generator used therewith, operate at temperatures which are closely the same.

Another object of the present invention is to provide a new and improved combined current collector shielding brushholder and vapor generator enclosure for a dynamoelectric machine and of such construction that a vapor generator enclosed therein may operate closely responsive to the temperature of a brush held thereby.

In accordance with one aspect of my invention, I provide an assembly of a plurality of metallic arcuate body segments each comprising an integrally formed brushholder and vapor generator container for making vaporization of the generator compatible with load requirements of an associated dynamoelectric machine, together with means for maintaining appropriate seals about the collector. In the embodiment herein illustrated and described, the shielding means include annular rings of good electrical insulating material joining the arcuate segments which make up said assembly and there is a heat responsive vapor generator within each segment of metallic material without insulating material interposed between the vapor generator and the metallic segment, in order to make the exudation of fluid from the vapor generator more directly dependent upon temperature of the brush or brushes held by the brushholder portion of the same segment.

My invention will be better understood from the following description taken in connection with the accompanying drawings, and its scope will be pointed out in the appended claims.

In the drawings, Fig. 1 is a side elevational view of an aircraft direct-current generator showing the commutator end thereof partially broken away to show some of the features of the invention; Fig. 2 is an enlarged elevation in section showing a portion of the commutator, brushes, and associated collector seal of Fig. 1; Fig. 3 is a cross-sectional view of the arrangement shown in Fig. 2 with the collector shielding brushholder broken away; Fig. 4 is a detailed section taken on line 4—4 of Fig. 3; Fig. 5 is a top view taken on the line 5—5 of Fig. 3; Fig. 6 is a bottom view taken on the line 6—6 of Fig. 3 with the commutator omitted; and Fig. 7 is a perspective view of the brushholder assembly attached to an end yoke 13 but with the commutator and brushes removed.

Referring now to Fig. 1, I have shown a dynamoelectric machine which has the outward appearance of a conventional aircraft direct-current generator having an outer frame 10 provided with ventilating medium ports 11 at one end. At the other end there is secured to the frame 10 as by bolts 12 and end yoke and bearing support 13, provided with ventilating medium ports 14. As indicated by the arrows 15, a blast of cooling air may be introduced through the ports 14 to pass through or around the stator and rotor members of the machine to cool such members before being exhausted out of the ports 11. I do not, however, mean to limit my invention to such an arrangement and obviously ventilating medium could enter at 11 and exhaust through parts 14 as indicated by dotted arrows 15a. The latter arrangement in some instances may be preferable in order to avoid excessive cooling of the vapor generators, hereinafter to be described, by preheating the air during its passage through and around stator and rotor so that it can aid vaporization at the vapor generators.

The machine is provided with a shaft 16 adapted to drive a current collector which in the illustrated embodiment is a commutator 17. The commutator is adapted to be contacted by a plurality of brushes 18 urged toward the collector by brush feeding springs 19. Means are provided for guiding each brush in its substantially radially inward movement toward the current collector and such means comprises an assembly of brushholders each of which, in accordance with the present invention, also serves as a good heat exchanging medium. I have found it desirable to make each such a brushholder, indicated at 20 in the drawings, by casting it of an aluminum alloy to provide such good heat conductivity. If desired, a brushholding box 21 as of stainless steel may be interposed between the brushes themselves and the brushholder segments 20. As will later become apparent from consideration of Figs. 3 and 5 of the drawings, in the illustrated embodiment each box 21 surrounds three sides of the associated brushes and is secured to the respective brushholder segment by screws 21s. The construction of the assembly of brushholder segments 20 to form a seal about the collector will be more clearly understood by reference to Figs. 2 and 3, but as seen in Fig. 1, it includes an annular ring 22 of electrical insulating material.

Referring now to Fig. 2 which is an enlarged view of a portion of Fig. 1 with additional parts broken away, it is seen that the commutator 17 comprises a commutator central shell 23, individual commutator segments 24, and shrink rings 25 and 26 designed to hold the peripheral assembly of commutator segments securely on said shell. Each commutator segment has a riser or ear portion 27 for connection with the parts of an armature winding 28.

As will become more readily apparent from later consideration of other figures of the drawing, the assembly of metallic brushholding segments 20 defines a sealing chamber 29 about the periphery of the collector, and, as shown in Fig. 2, I have provided means for sealing this chamber on the axially outward side by providing the annular ring 22 secured to the yoke and bearing support 13, as well as to the brushholder segments 20, by a plurality of screws 30. Since the different brush sets operate at different potentials, it is, of course, desirable that the annular ring 22 be of electrical insulating material, such as an organic glass fibre reinforced laminate. With the construction shown, it is desirable to insulate each screw 30 from the yoke 13 as by employing an insulating bushing 31 and one or more insulating washers 32 at each screw location. Since the brushholder segments 20 and insulating ring 22 are stationary while the entire assembly of machine shaft 16, shell 23, segments 24 and shrink rings 25 and 26, rotates with the other rotatable members of the machine, a close running clearance is provided between an inner periphery of the stationary annular insulating ring 22 and some rotatable part such as the shrink ring 25. While a rubbing seal could be used without doing violence to the spirit of the present invention, I have found it preferable to use a running clearance of, for example, .005″ radial, as such a clearance will provide adequate sealing and at the same time eliminate problems of friction, heat and wear, allowing a construction whose characteristics do not vary with use.

At the opposite axial end of the commutator sealing brushholder assembly, a similar running seal is provided and in the illustrated embodiment this is between surfaces of the commutator segments 24 including their ears 27 and a stationary insulating ring 33 secured to the main body of each brushholder in any suitable manner such as by screws 50 shown in Figs. 2, 5, and 7. Insulating ring 33 is also made of an insulating material such as a glass laminate, and if desired there may also be provided a labyrinth seal between this stationary part and a rotating part, such as that provided by slot 33s engaged by a corresponding projection on the commutator ear 27 as shown in Fig. 2.

Referring now to Fig. 3, which is a cross-sectional view of the arrangement of Fig. 2, it will be apparent that the illustrated arrangement is that of an integral commutator shielding brush housing assembly adapted to hold brushes at six circumferentially equally spaced brush positions. In Fig. 3, however, only a portion of the complete brush housing assembly is shown. This assembly is progressively cut away around the circumference so that at one sextile position the axially outer insulating ring 22 is shown, at the next position the ring 22 is cut away to show the axially outer end of one of the metallic shielding brushholder segments 20 which is seen to be generally arcuate in configuration, at the next position a similar arcuate brushholder segment is shown in section, and at the next position the brushholder segment is eliminated entirely to show the axially innermost stationary insulating ring 33.

The seal about the sealed collector chamber 29 is provided primarily by having the brushholder assembly comprise the plurality of arcuate metallic body portions 20 spaced from the peripheral surface of the collector, with these arcuate main body portions having interspersed insulating members 36 to form a complete circle about the collector periphery, defining the space 29 thereabout with this space sealed at the axial ends thereof (to prevent the cooling air blast from reaching the sealed chamber) by flange members such as the insulating rings 22 and 33 already described. The interbrush position insulating members 36 may be made of any suitable insulating material, for example of polytetrafluorethylene. These members 36 extend from one axial end insulating member (such as 22) to the other (such as 33) and they are shown T-shaped with the arms of each T interfitting with slots provided in the adjacent brushholder segments 20 to form a good seal therebetween.

Leakage between the individual brushes 18 and the brush boxes 21 in which they are contained is prevented by spring means which in the illustrated embodiment comprises a spring member 37 fastened by one or more screws 38 to the main body 20 of the brushholder. While the sealing spring 37 might conveniently be made of any one of numerous materials, I have found that if the member is made of a metal such as brass it is apt to prevent free radial movement of the brush within its holder because the metal tends to score the brush adjacent face, and I prefer to make the spring member of a plastic material such as polytetrafluorethylene (sometimes known as teflon). One end of the spring 37 makes contact completely across the adjacent face of the brush which may be regarded as the brush front face, so the flexible section of plastic material 37 completely seals this front face. Meanwhile, the brush opposite, or back, face is sealed by reaction pressure caused by a biased force exerted by brush feed spring 19. That is the top of each brush 18 is a tapered surface 18t, which may be of metal, and each feed spring 19 bears substantially perpendicularly against the associated brush top 18t so as to provide a brush spring force which is biased with respect to the brush feed axis. This biased brush spring force, indicated by arrow 19f in Fig. 3 resolves into a brush feed component 39 axially of the brush and, at right angles thereto, a side thrust component 39s which effectively seals the brush back face by holding it tightly against the brush box 21. The area of the remaining side faces of the brushes (that is, at the brush ends) is small and I have found that the mere fit of the brushes in the brushholders or brush boxes can suffice to provide adequate sealing along these end faces.

I provide means for generating a vapor within the sealed chamber 29 and as indicated by Fig. 3, in the illustrated embodiment the vapor generating means comprises a substance 40, such as liquid saturated wool or felt, surrounded by a cylindrical screen or other foraminous covering 41 spaced from the walls of an axially extending cylindrical chamber 42 formed in each cast metallic segment 20. This arrangement of a cartridge comprising a liquid saturated substance, or a solid capable of subliming, and a circular screen thereabout with the cartridge contained within a space extending 360° about the screen to provide an optimum area for evaporization is not my invention but is the invention of Elmer T. Hansen and is described and claimed in his copending application Serial No. 239,874, filed August 2, 1951, and assigned to the assignee of the present invention. Communication between the vapor generator reservoir 42 and the collector shielding chamber 29 is provided by radially extending holes 43 provided in each segment 20 to join these chambers.

The arrangement just described may be more clearly understood from consideration of Fig. 4 which is a cross-sectional view along the line 4—4 of Fig. 3. As seen in Fig. 4, the annular screen 41 of the vapor cartridge is held by larger diameter end discs 44 and 45 interconnected by a central tube or rod 46. When complete with vapor producing substance and with the screen, the above described parts are assembled to form a cartridge which is placed in the annular chamber 42. If desired a hook 47 may be provided on the cartridge assembly to facilitate its removal from the bore of chamber 42, and a threaded sealing plug 48 may be used to seal the cartridge in its operating position. Also, if desired, a cotter pin 49 may be used to retain the sealing plug.

In conventional forced air cooled dynamoelectric machines, the direction of forced ventilating medium flow is principally axially and hence it is advantageous to arrange an elongated vapor generator of the type just described so that (as shown in the drawing) its longitudinal axis is parallel to the axis of the machine and its collector, as this will permit good heat transfer between brush housing and air blast, as well as good heat transfer between brushes and vapor generator. This arrangement of cylindrical vapor generators extending parallel to the dynamoelectric machine axis also has the advantage of permitting removal or replacement of the cartridge axially, rather than, for example, radially. Due to prevalent methods of installing an aircraft generator, the only place completely accessible is an end of the generator. Thus, with axially mounted cartridges available for demounting from the accessible end of the electric generator, the presence of other accessories such as starters, oil pumps and the like, close up against the periphery of the main generator creates no problem of interference with ready access to vapor generator cartridges.

Fig. 5 of the drawings is a view along the line 5—5 of Fig. 3 and clearly shows the axially inner insulating and shielding ring 33 secured to a main body portion 20 by one of an assumed plurality of screws 50. For clarity, only one metallic main body portion 20 and only one interbody portion insulating member 36 are shown in Fig. 5, other like members being removed to show the commutator 17, its ears 27 and shrink ring 25. Fig. 6 is a view, along the line 6—6 of Fig. 3, of the bottom of a single metallic main body portion 20 and in Fig. 6 I have clearly shown the spring member 37 reinforced by a steel plate 51 (see Fig. 3) and sealing one face of each adjacent brush 18.

Fig. 7 is a perspective view showing the assembly of arcuate brushholder segments 20 with interposed insulating members 36, end insulating rings 22 and 33, with the assembly shown secured to the generator yoke 13 but removed from the rest of the generator.

All of the features shown in Fig. 7 having to do with the present invention have already been described and need not be described again. There is additionally shown in Fig. 7 radial grooves 52 furnished for the purpose of permitting ventilating medium to enter the machine at radially inner points to pass therefrom between the commutator shell 23 and the machine shaft 16 through the clearances therebetween as indicated in Fig. 2.

During operation, the outer air blast, indicated by the arrows 15 of Fig. 1, contacts the entire outer surface of each brushholder segment 20 so that there is good radiation from the brushholder assembly, thereby to increase the cooling of the brushes and commutator, and consequently increase the useful life of these collecting members. Each vapor generator also is held in such a position that it is intimately associated with a brushholder. Accordingly, the temperatures of brushes and of vapor generators are closely the same so that the rate of vaporization is closely matched automatically to load requirements. Because the arcuate main body segments are identical, the entire assembly operates at substantially the same temperature with the advantage that there need be no critical fit of stationary interbrush position insulators (36) with the rotating collector and with the advantage that there are no hot spots nor cold spots, and consequently no excessive condensation of the vapor. Each holder has adequate heat transfer to the air blast as well as adequate heat transfer from brushes to vaporizers.

There is thus provided a collector seal member adapted to operate as a brushholder and as an enclosure for a vapor generator, with all of the parts so combined that the assembly also serves to keep the collecting members cool. Each arcuate main body portion of the total brushholder assembly has its own sealing means and has provision for its own reservoir of vapor-forming material. A virtue of this construction is that the heat generated from the brush, and heat absorbed into the sealed portion from the commutator will act to increase the vapor pressure produced by the vapor generator, while at the same time, the construction affords a large outside area exposed to the cooling blast of air.

While I have illustrated and described a particular embodiment of my invention, modifications thereof will occur to those skilled in the art. I desire it to be understood, therefore, that my invention is not to be limited to the particular arrangement disclosed and I intend in the appended claims to cover all modifications which do not depart from the spirit and scope of my invention.

What I claim as new and desire to secure by Letters Patent of the United States is:

1. A combined brushholder and shield for a rotating annular current collector of a dynamoelectric machine comprising an assembly of arcuate metallic segments spaced around the periphery of said collector and out of contact therewith, electric insulating means interspersed between adjacent segments of said assembly and extending axially along the periphery of the collector, an annular end flange of electrical insulating material secured to said metallic segments at each axial end thereof and forming a running seal with said collector to form a sealed chamber between metallic segments and collector, and a separate brush mounted in good heat conducting relationship with each metallic segment and extending therethrough for contact with said collector in said sealed chamber.

2. A combined brushholder and shield as in claim 1 further characterized by each arcuate metallic segment having walls defining a cylindrical vapor chamber extending axially of said collector and in communication with said sealed chamber formed between said metallic segments and said collector.

3. A combined brushholder and shield as in claim 1 further characterized by each arcuate metallic segment having walls defining a vapor chamber in communication with said sealed chamber, and each of said metallic segments having a vapor generator in said chamber whereby the vapor generators thus provided may operate closely responsive to the temperature of said collector and of said brushes.

4. For use in a dynamoelectric machine having an annular current collector member, a collector shielding brushholder comprising an arcuate metallic member designed to fit about a portion of the periphery of said collector and in spaced relation thereto to form a portion of a sealed chamber extending between said metallic member and said collector member, one portion of said metallic member having an opening for receiving a contact brush extending through said member for contacting said collector while in good heat exchanging relationship with said metallic member, and another circumferentially spaced portion of said metallic member having an opening communicating with said sealed chamber and for holding a vapor generator in good heat exchanging relationship with said metallic member.

5. A dynamoelectric machine having an annular current collector, an annular assembly of arcuate metallic members each designed to fit about a portion of the periphery of said collector while spaced therefrom to form a portion of a sealed chamber extending between said collector and said annular assembly, a separate contact brush mounted in good heat exchanging relationship with each of said metallic members and extending therethrough and contacting said collector in said sealed chamber, and a separate vapor generator mounted in good heat exchanging relationship with each of said metallic members and in communication with said sealed chamber.

6. In a dynamoelectric machine, an annular current collector member, means including an arcuate metallic member spaced from a portion of the periphery of said collector member for forming a sealed chamber between said members, a brush mounted in good heat conducting relationship with said metallic member and contacting said collector member in the sealed chamber, and a temperature responsive vapor generator in communication with the sealed chamber and carried by said metallic member in good heat conducting relationship therewith.

7. In a dynamoelectric machine, an annular collector member, means including an arcuate metallic member spaced from a portion of the periphery of said collector for forming a sealed chamber between said members, a brush mounted in good heat conducting relationship with said metallic member and contacting said collector in said sealed chamber, said metallic member having an elongated opening therein extending substantially parallel to the axis of said collector member and in communication with said sealed chamber, and heat responsive vapor forming material in said elongated opening and in good heat conducting relationship with said metallic member.

8. In a dynamoelectric machine, an annular commutator member, means including an arcuate metallic member spaced from a portion of the periphery of said commutator for forming a sealed chamber between said members, a brush mounted in good heat conducting relationship with said metallic member and contacting said commutator in said sealed chamber, said metallic member having a cylindrical opening extending inwardly from an axial end of said metallic member and in communication with said sealed chamber, and a removable cartridge having heat responsive vapor forming material in said opening and having an end cap sealing said opening at said axial end of said metallic member with said vapor forming material in good heat exchanging relationship with said metallic member in said opening.

9. In a dynamoelectric machine adapted to receive ventilating medium passing therethrough from one axial end to the other and having an annular current collector, a combination brushholder, shield and vapor generator housing comprising a circumferential assembly of arcuate metallic main body portions spaced around said collector and each having box-like means for guiding a brush for movement toward a peripheral surface of said collector, said main body portions having interspersed insulating members and defining at least one chamber between said collector peripheral surface and said body portions, sealing means for the axial ends of said chamber comprising annular end flanges of electrical insulating material secured to said body portions and forming a running seal with said collector, each of said main body portions having a cylindrically shaped axially extending vapor generator cartridge chamber communicating with said sealed chamber, and a substantially cylindrical vapor generator cartridge in each of said cartridge chambers, said main body portions being configured and arranged to adapt said cartridge to exude a brush life enhancing medium at a rate responsive to temperature of said body portions, said body portions also being configured and arranged to be cooled by passage thereover of said ventilating medium which is prevented by said body portions, insulating members and sealing means from reaching said sealed chamber, whereby vapor lubrication of said collector responsive to load requirements may be readily provided in a combination collector shield and brushholder assembly adapted to be cooled by said ventilating medium.

10. In a dynamoelectric machine having an annular current collector, a combination as in claim 9 further characterized by spring means for sealing at least two faces of each brush with respect to associated faces of the respective box-like means for guiding said brush.

No references cited